(12) United States Patent
Eich (10) Patent No.: US 8,308,311 B2
(45) Date of Patent: Nov. 13, 2012

(54) RECONFIGURABLE INSTRUMENT CLUSTER

(75) Inventor: Roger W. Eich, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 119 days.

(21) Appl. No.: 12/160,087

(22) PCT Filed: Jan. 5, 2007

(86) PCT No.: PCT/US2007/000241
§ 371 (c)(1),
(2), (4) Date: Jul. 3, 2008

(87) PCT Pub. No.: WO2007/081782
PCT Pub. Date: Jul. 19, 2007

(65) Prior Publication Data
US 2009/0009983 A1    Jan. 8, 2009

Related U.S. Application Data

(60) Provisional application No. 60/756,894, filed on Jan. 6, 2006.

(51) Int. Cl.
*G01D 11/28* (2006.01)

(52) U.S. Cl. ............... 362/23; 362/489; 362/28; 362/29

(58) Field of Classification Search .................... 362/23, 362/28–30, 471, 482, 489
See application file for complete search history.

(56) References Cited

U.S. PATENT DOCUMENTS

| | | | |
|---|---|---|---|
| 4,777,480 A | 10/1988 | Okamoto et al. | |
| 5,272,463 A * | 12/1993 | Furuya et al. | 340/438 |
| 6,302,551 B1 * | 10/2001 | Matumoto | 362/27 |
| 6,714,126 B2 * | 3/2004 | Wada | 340/438 |
| 7,347,576 B2 * | 3/2008 | Wang et al. | 362/23 |
| 2002/0001183 A1 * | 1/2002 | Shigehiro | 362/23 |
| 2003/0210538 A1 | 11/2003 | Tamura | |
| 2003/0221606 A1 | 12/2003 | Quigley et al. | |

FOREIGN PATENT DOCUMENTS

| | | |
|---|---|---|
| DE | 25 57 238 A1 | 6/1997 |
| WO | WO 2006/041876 A | 4/2006 |
| WO | WO 2007/048140 A | 4/2007 |

* cited by examiner

*Primary Examiner* — Robert May
(74) *Attorney, Agent, or Firm* — Foley & Lardner LLP (57) ABSTRACT

Provided are several reconfigurable instrument clusters for instrument panels in an automotive vehicle. Instrument cluster comprises a value indicia configured to indicate a value of a plurality of vehicle data and an appliqué comprising first and second indicia. A control circuit is configured to receive first and second vehicle data from different data sources and further configured to control the value indicia and first indicia to indicate the first vehicle data and, in response to a signal, to control the value indicia and second indicia to indicate the second vehicle data.

5 Claims, 11 Drawing Sheets

RECONFIGURABLE INSTRUMENT CLUSTER

BACKGROUND

Automotive vehicles include an instrument panel with instrumentation to provide information about the operations of the vehicle to the vehicle operator, typically in an aesthetically pleasing manner. A wide variety of information about a vehicle—performance, maintenance, orientation, fuel level, door closure, interior temperature, ambient temperature, compasses and so forth—may be displayed in clusters in various locations throughout the instrument panel. The instrument panel may include any number of different display devices (e.g., liquid crystal display ("LCD"), light emitting diode ("LED"), motor driven pointer over appliqué, etcetera).

One drawback of conventional instrument panels is that their packaging is limited primarily by the dimensions of the interior cavity of the automobile as well as the operator's ability to conveniently view the instrumentation. While customer demands regarding vehicle information increase, real estate within the vehicle instrument panel decreases. It is therefore increasingly difficult to display more non-traditional information within the instrument panel along with traditional instrumentation. Moreover, additional instrumentation usually results in additional part and assembly costs.

Another drawback of conventional instrument panels is that the instrumentation cannot be altered by the vehicle operator or in response to vehicle conditions. Spaces in the instrument panel dedicated to fuel level (for example) may not later be changed to display vehicle speed or ambient temperature. Ideally, the vehicle operator prefers to have information displayed in the most convenient location on an as needed or "just-in-time" basis.

Accordingly, what is needed is an improved instrument panel and cluster for an automobile. Further, what is needed is an improved manner of configuring a cluster of instrumentation within the instrument panel to display an increased amount of information within the same or smaller amount of space. Further still, what is needed is a reconfigurable and aesthetically pleasing instrument cluster.

The teachings herein below extend to those embodiments which fall within the scope of the appended claims, regardless of whether they accomplish one or more of the above-mentioned needs.

SUMMARY

According to one exemplary embodiment, an instrument cluster for use in a passenger vehicle comprises a value indicia configured to indicate a value of a plurality of vehicle data and an appliqué comprising first and second indicia. A control circuit is configured to receive first and second vehicle data from different data sources and further configured to control the value indicia and first indicia to indicate the first vehicle data and, in response to a signal, to control the value indicia and second indicia to indicate the second vehicle data.

According to another exemplary embodiment, an instrument cluster for use in a passenger vehicle comprises a light channel, a plurality of light sources coupled to the light channel. A control circuit is configured to sequentially illuminate the plurality of light sources based on their respective locations upon receipt of a signal.

According to yet another exemplary embodiment, an instrument cluster for use in a passenger vehicle comprises at least one light channel and an appliqué coupled to the at least one light channel. The appliqué includes a plurality of indicia. A light source is configured to selectively illuminate any one of the plurality of indicia. A reconfigurable display is configured to illustrate a plurality of messages; each message in the plurality of messages corresponds to at least one indicia in the plurality of indicia. A control circuit is coupled to the light source and reconfigurable display. The control circuit is configured to receive a plurality of signals, each signal in the plurality of signals corresponding to at least one indicia in the plurality of indicia. Upon receiving a signal in the plurality of signals, the control circuit is configured to illustrate the corresponding message in the plurality of messages and the corresponding indicia in the plurality of indicia.

According to yet another exemplary embodiment, an instrument cluster for use in a passenger vehicle comprises a board. The board comprises a scale portion. The instrument cluster further comprises a hub. The hub includes a non-protruding value indicia and is configured to rotate with respect to the scale portion. Hub is coupled to the instrument cluster in front of the board with respect to an interior of the passenger vehicle. A control circuit is configured to control the hub relative to the scale portion to display vehicle data.

DETAILED DESCRIPTION OF THE EXEMPLARY EMBODIMENTS

Figure 1:
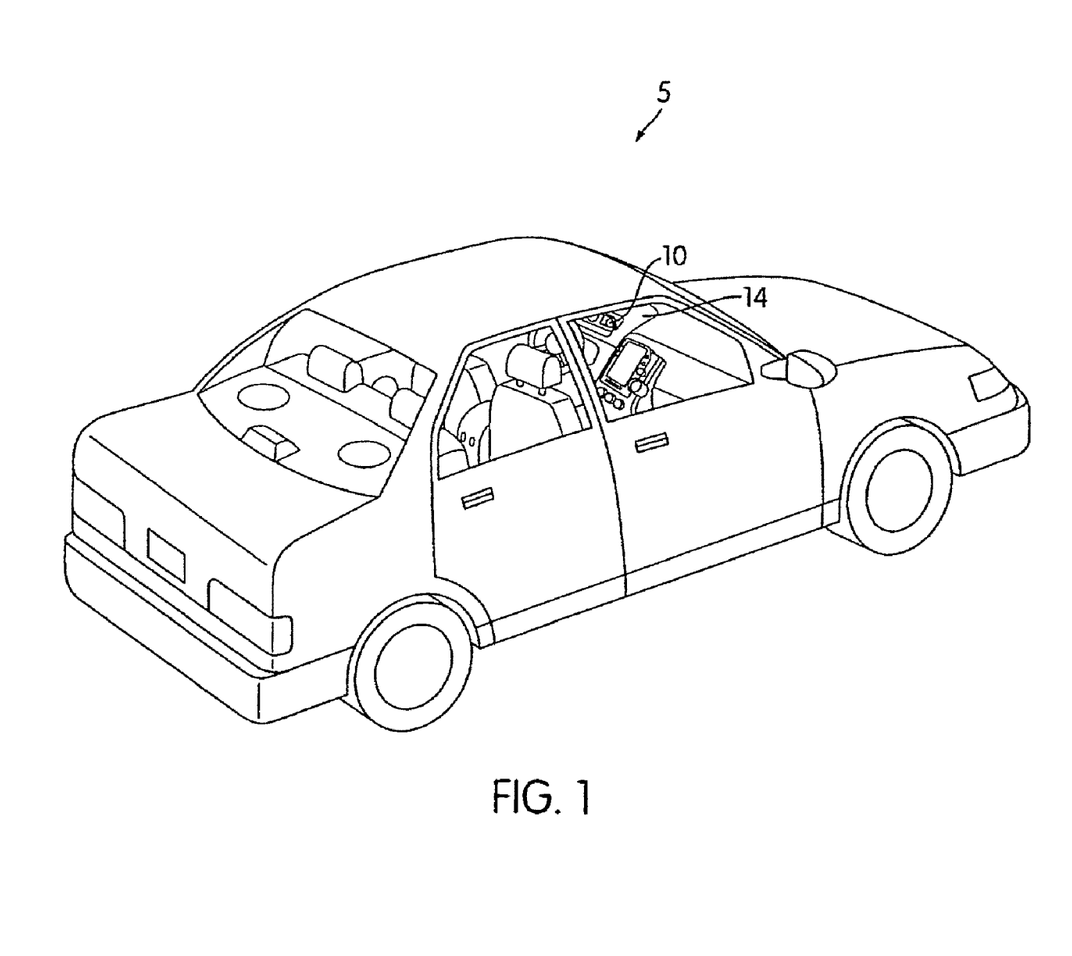
FIG. 1 is a schematic isometric view a of a vehicle with an instrument according to an exemplary embodiment.

Referring first to FIG. 1, a vehicle 5 is shown including an instrument cluster 10 according to an exemplary embodiment. Instrument cluster 10 is provided in the instrument panel of vehicle 5 and displays a variety of automobile data for a driver. While vehicle 5 is shown as a four-door sedan, it should be understood that instrument cluster 10 may be included in a wide variety of vehicles including but not limited to minivans, sport-utility vehicles, or trucks.

Figure 2:
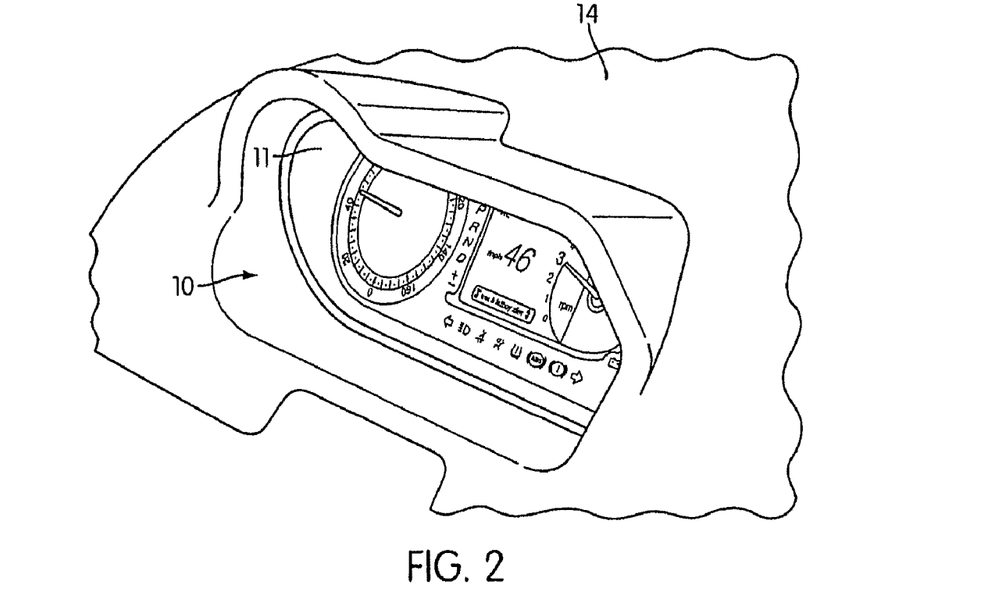
FIG. 2 is a schematic of two instrument clusters in an instrument panel, according to another exemplary embodiment.
Figure 3:
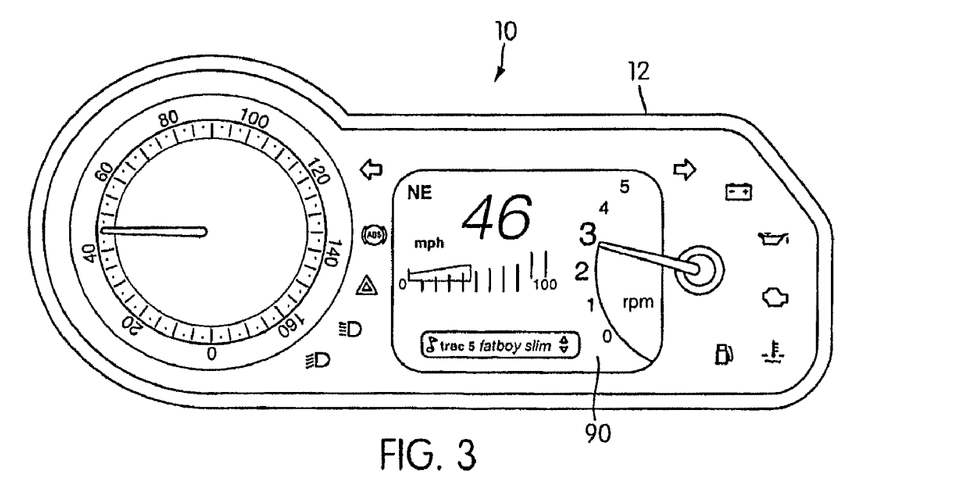
FIG. 3 is a schematic front view of an instrument cluster, according to an exemplary embodiment.

Referring to FIGS. 2-3, an instrument cluster 10 according to an exemplary embodiment will be described. Instrument cluster 10 is an assemblage of parts configured to provide automobile data from a plurality of automobile systems (e.g., speedometers, tachometers, fuel gauges, engine oil temperature sensors, engine oil gauges, engine water temperature sensors, engine oil pressure sensors, battery level sensors etc.) to an operator of the automobile and/or passengers of the automobile. Instrument cluster 10 comprises a lens and housing 12 configured to be fixedly mounted to an instrument panel 14 of an automobile at one or more locations on the instrument panel, such as, in front of the operator, near the center stack, etcetera, or even in an overhead compartment coupled to the headlined of the vehicle. Instrument cluster is suitable for use with an automobile, which can be any passenger vehicle used for land transportation, such as a car, SUV, miniature van, van, truck, etcetera.

In the illustrated exemplary embodiment, instrument cluster 10 provides a light channel 16 (or "white box") configured to guide light within the cavity of the instrument panel 14. Light channel 16 is coupled to instrument cluster 10 and is opaque so as to filter light within light channel 16. Light channel 16 is commonly composed of a molded plastic. While the illustrated embodiment only shows one light channel a plurality of light channels may be utilized with instrument cluster in order to segregate lighting within instrument cluster.

Figure 4A:
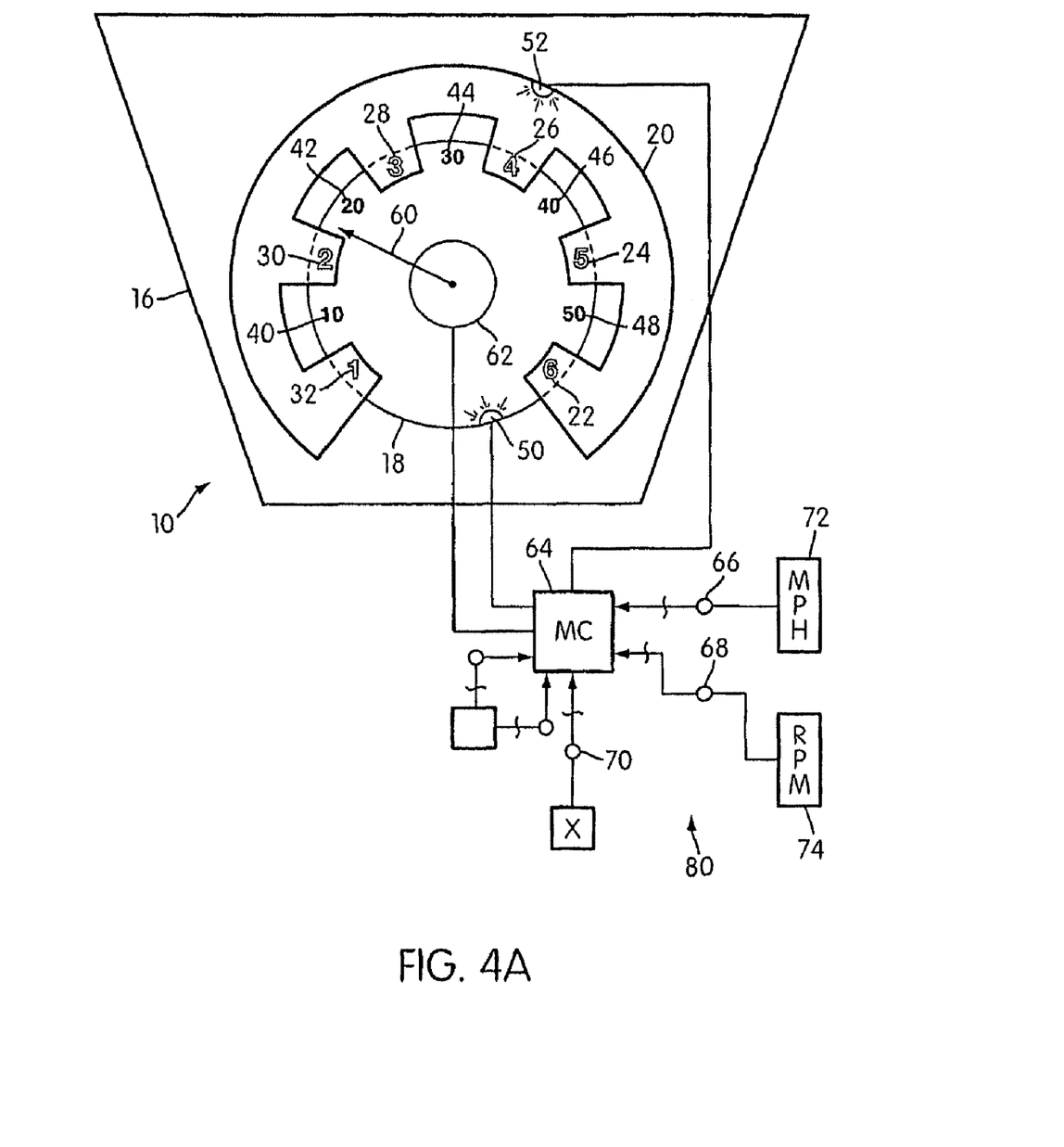
FIG. 4A is a schematic of an instrument cluster and electronic circuit, according to an exemplary embodiment.

Coupled to light channel 16 are a plurality of appliqués 18 and 20, as illustrated in the exemplary embodiment of FIG. 4A. In the illustrated exemplary embodiment, each appliqué includes silhouettes or selectively illuminable indicia (22, 24, 26, 28, 30, 32, 40, 42, 44, 46, 48). Each indicia corresponds to a unit of measurement for vehicle data. For example, as illustrated in FIG. 4A, appliqué 18 comprises first indicia such as 22 and 24 which are on a scale for engine revolutions per minute (in kilo-revolutions). Appliqué 20 comprises second indicia, such as 40 and 42, which are on a scale for vehicle speed (in miles or kilometers per hour). Indicia may also be configured to display any other information which may be communicated at progressive levels. Indicia 22, 24, 26, 28, 30, 32, 40, 42, 44, 46, and 48 have active and inactive states. In the active state indicia are visible to the vehicle operator. Indicia are substantially opaque in the inactive state. The material of appliqué 18 and 20 is configured to substantially transmit light from light sources 50 and 52, respectively, when lit, and to provide a substantially opaque appearance when not lit. Co-pending U.S. Application No. 60/677,983, filed May 5, 2005 entitled, "Vehicle Lens Assembly" is commonly assigned and hereby incorporated by reference in its entirety.

In the illustrated exemplary embodiment of FIG. 4A, indicia are activated via illumination by light sources 50 and 52. Light source 50 and 52 are coupled to light channel 16. Light source 50 is configured to illuminate (or activate) first indicia 22, 24, 26, 28, 30, and 32 of appliqué 18; light source 52 is configured to illuminate (or activate) second indicia 40, 42, 44, 46, and 48 of appliqué 20. Light sources may be alternatively arranged to illuminate either appliqué and/or any one of the indicia. As appliqué 20 illuminates, indicia regarding vehicle speed are activated and visible to the vehicle operator. Alternatively, when appliqué 18 illuminates, indicia regarding engine performance are activated and visible to the vehicle operator. Therefore, instrument cluster 10 is configured, in the illustrated exemplary embodiment, to display information regarding vehicle speed and information regarding engine performance within the same instrument cluster location or position therein. Though the illustrated exemplary embodiment shows two appliqués and two light sources, any plurality of appliqués and light sources may be utilized and combined to alternatively display different information. Appliqués or other display surfaces may provide lines, marks, or other indicia representing different values of the automobile data, wherein value indicias indicate the particular value of the vehicle data or parameter sensed by the respective automobile system. Moreover, ultraviolet inking may be utilized to selectively activate indicia on appliqué.

In the illustrated exemplary embodiment of FIG. 4A, value indicia 60 is movable with respect to appliqué 18 and 20, and specifically with respect to indicia selectively illuminable indicia (22, 24, 26, 28, 30, 32, 40, 42, 44, 46, 48). Value indicia 60 is illuminable and extends from the center of appliqués to any one of the indicia therein. In the illustrated embodiment, value indicia 60 is motor driven by a motor 62—a rotatable motor (e.g. a stepper motor, DC motor, etc.) configured to provide an analog value indicia-type display—which rotates value indicia 60 with respect to appliqués 18 and 20. Value indicia 60 may be configured to cover an operational range of movement which is less than 360°. The end user is able to read the location of value indicia 60 with respect to any of the indicia and make a determination of certain information, e.g. speed or engine RPMs.

Figure 4B:
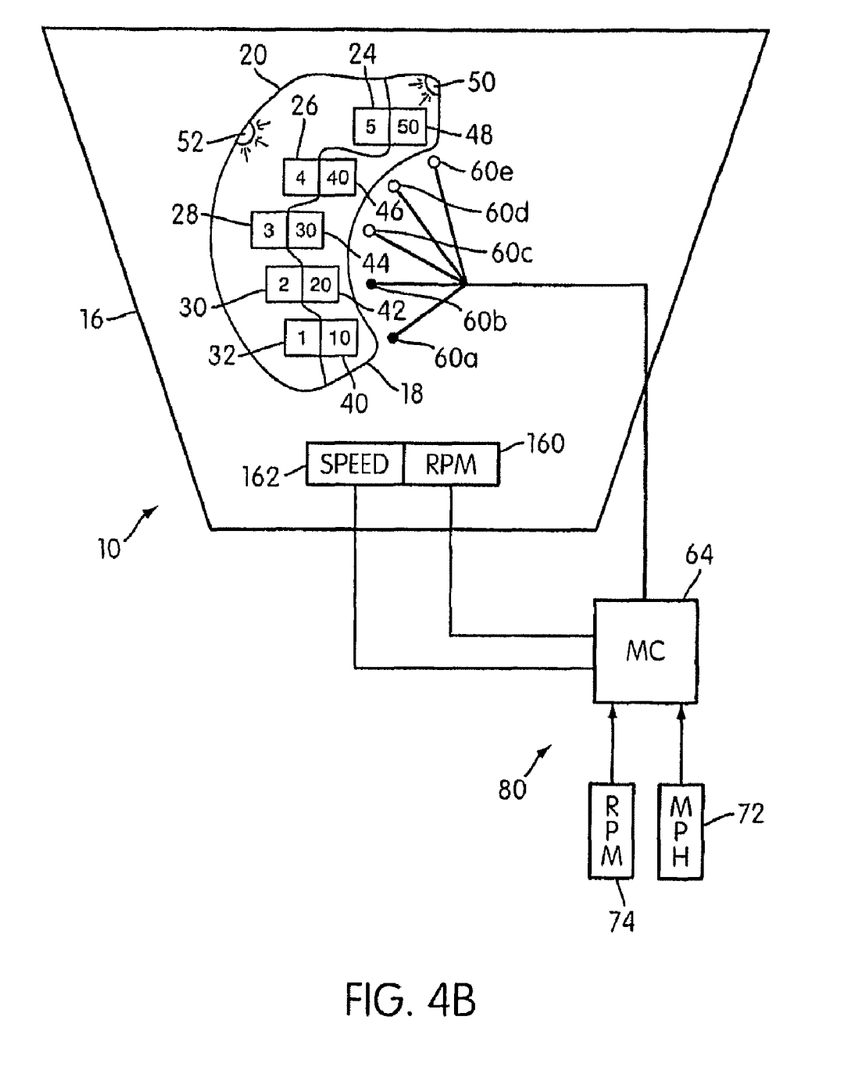
FIG. 4B is a schematic of an instrument cluster and electronic circuit, according to another exemplary embodiment.
Figure 4C:
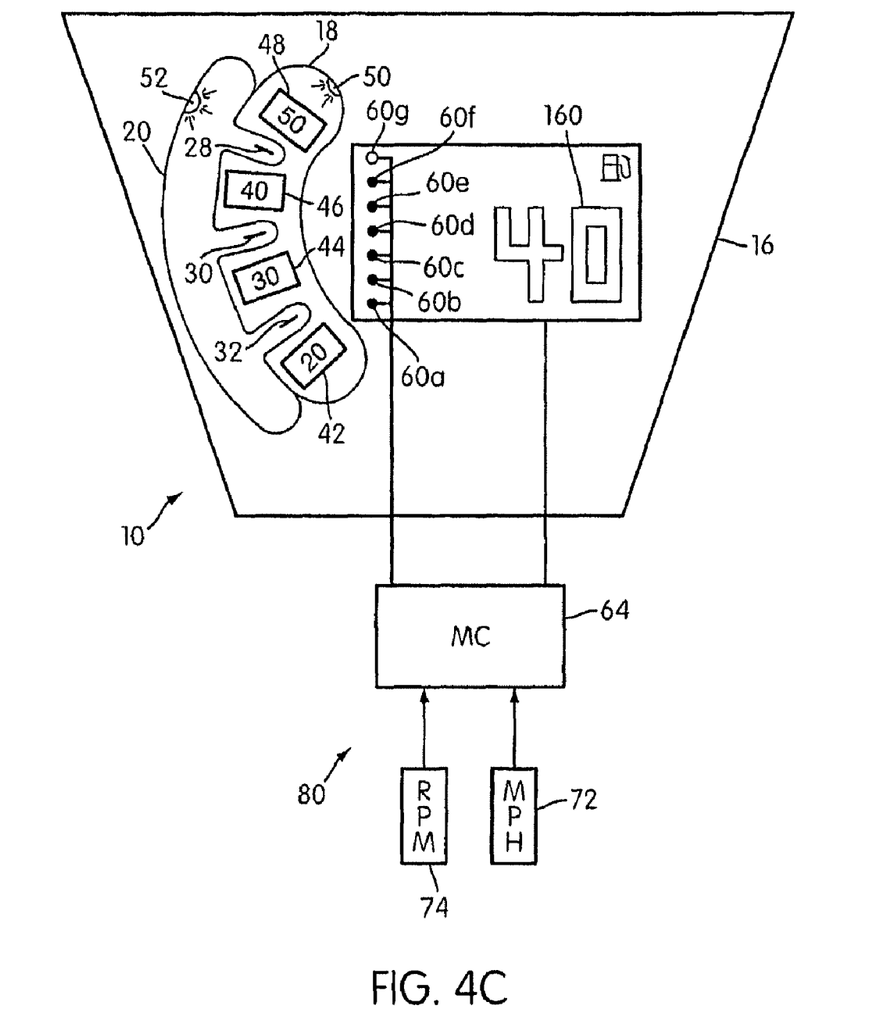
FIG. 4C is a schematic of an instrument cluster and electronic circuit, according to another exemplary embodiment.

In another exemplary embodiment, value indicia is linearly movable with respect to indicia or may be incorporated into an LED or LCD screen as illustrated in the exemplary embodiments of FIG. 4B-C. In another exemplary embodiment, value indicia changes colors to indicate certain predetermined conditions, such as yellow to indicate cautionary conditions or green to indicate normal status. Moreover, value indicia may be colored to coordinate with active indicia on any one of appliqué provided in the plurality of appliqué. For example, if appliqué 18 is configured to display green colored indicia, value indicia may be colored green while functioning atop appliqué 18. Alternatively, when value indicia is operating with appliqué 20, which may be blue and indicative of engine RPMs, value indicia may be colored blue. More examples are provided in U.S. Patent Application No. 60/346, 704, entitled, "Instrument Cluster", filed Jan. 4, 2002 which is commonly assigned and hereby incorporated by reference herein in its entirety.

In one exemplary embodiment, when value indicia 60 is illuminable and is substantially opaque when not illuminated so that value indicia 60 appears invisible to the vehicle operator as illustrated in FIG. 4B-C. In the illustrated exemplary embodiment instrument cluster 10 may include a plurality of first indicia 24, 26, 28, 30 and 32 which are illuminable by a light source 52; likewise, second indicia 40, 42, 44, 46, and 48 are illuminable by light source 50. Each light source is coupled to microprocessor 64 which selectively illuminates any set of indicia 24, 26, 28, 30, 32, 40, 42, 44, 46 and 48. To communicate the relevant vehicle information to the vehicle user control circuit 80 is operative to illuminate any one of value indicia 60a-g. For example, as illustrated in the exemplary embodiment of FIG. 4B, to indicate a vehicle speed of 20 mph light source 50 may be powered and value indicia 60a-b may activated. Alternatively, to indicate an engine speed of four kilo-RPMs light source 52 may be powered and value indicia 60d may be illuminated. Likewise, as illustrated in the exemplary embodiment of FIG. 4C, to indicate a vehicle speed of 20 mph light source 50 may be powered and value indicia 60a may activated. Alternatively, to indicate an engine speed of three kilo-RPMs light source 52 may be powered and value indicia 60f may be illuminated. Source indicia 160 and 162 are operative to indicate which of the two or more vehicle data is being represented by value indicia. In such arrangements a pointer is not necessary to communicate vehicle information to the vehicle user through instrument cluster 10. Moreover, in the illustrated exemplary embodiments of FIGS. 2-4C first indicia 22, 24, 26, 28, 30, and 32 are in proximate vicinity with respect to second indicia 40, 42, 44, 46, and 48 to conserve space within instrument cluster 10. For example, first indicia and second indicia can be provided in the same portion of instrument cluster 10 which is traditionally displayed in two separate areas of instrument cluster 10. First and second indicia displaying two different sets of vehicle information may be compacted into substantially the same area of instrument cluster 10, as shown in FIGS. 2-4C, thus providing the same information to the vehicle user in a smaller amount of space.

Arrangements of indicia 22, 24, 26, 28, 30, 32, 40, 42, 44, 46, 48 are not limited to a circular arrangements in establishing proximate vicinity. For example, indicia 22, 24, 26, 28, 30, 32, 40, 42, 44, 46, 48 may be adjacent, interposed, interspersed, co-linear, and/or in any geometric formation or relationship. In an alternative embodiment, first indicia and second indicia need not be in proximate vicinity; however, substantially the same portion of instrument cluster can still be utilized to display first and second vehicle data by utilizing the same value indicia to show both first and second indicia at different times. In this embodiment, a source indicia can indicate which of the two or more vehicle data is being represented by value indicia, yet first and second indicia need not be proximate to each other. For example, first indicia 160 and second indicia 162 could be spaced farther apart with respect to each other.

Value indicia 60, stepper motor 62 and light sources 50, 52 are governed by a control circuit 80. Control circuit 80 is configured to receive vehicle data (or a signal), to control value indicia 60 to indicate a first vehicle data using a first indicia (e.g., 22, 24, 26, 28, 30, and 32 of appliqué 18) to the vehicle operator and, in response to a command, to control value indicia 60 to indicate a second vehicle data using the second indicia (e.g., 40, 42, 44, 46, and 48 of appliqué 20). In one exemplary embodiment, control circuit 80 includes a control circuit 64 which is configured to receive any plurality of signals (or vehicle data e.g., 66, 68 and 70) relating to vehicle information. Control circuit 64 is configured to receive a signal indicative of any of the following: vehicle speed, engine speed, maintenance, orientation, fuel level, door closure, interior temperature, ambient temperature, compasses, etcetera. In the illustrated exemplary embodiment, control circuit 64 is configured to receive signal 66 and signal 68. Signal 66 is indicative of vehicle speed and is coupled to a data source 72 (e.g., a speed sensor). Signal 68 is indicative of engine speed and is coupled to a data source 74 (e.g., a tachometer). When the vehicle operator wishes to have information regarding vehicle speed (for example) displayed vehicle data 70 is received by control circuit 64. Control circuit 64 supplies power to light source 52 which activates second indicia 40, 42, 44, 46, and 48 of appliqué 20. Value indicia 60 is driven or rotated by stepper motor 62 which may be governed according to the appropriate scale by control circuit 64.

Alternatively, when the vehicle operator wishes to have information regarding engine speed (for example) vehicle data 68 is received by control circuit 64 which supplies power to light source 50, thereby activating first indicia 22, 24, 26, 28, 30, and 32 of appliqué 18. Value indicia 60 is rotated according to RPMs (or kilo-RPMs) by control circuit 64. Therefore, value indicia 60 may be utilized to display multiple information having varying scales or units of measurement.

In the illustrated exemplary embodiment of FIG. 4A-C, control circuit 64 is also configured to activate light sources (50, 52) according to any one of a plurality of predetermined conditions. For example, in vehicles with dual clutch transmissions, the vehicle transmission operates selectively in automatic mode or manual mode. When the vehicle is in automatic mode it may be desirable to have engine speed displayed in a particular area of instrument cluster. Light source 50 may be activated by control circuit 80 to accommodate. When the vehicle user switches the vehicle into manual mode it may be desirable to illuminate light source 52, activate indicia 40, 42, 44, 46, and 48 of appliqué 20, and provide information regarding engine speed to the vehicle operator. Control circuit 64 is configured to automatically switch between supplying power to light source (50, 52) according to the operating mode of the transmission. While in the illustrated embodiment, control circuit 80 is configured to display information about vehicle speed and RPMs, in another exemplary embodiment control circuit 80 is configured to display information regarding any number of conditions including: vehicle speed, engine speed, time, ambient temperature, interior temperature, atmosphere composition and so forth.

In the illustrated exemplary embodiment of FIG. 4A-C, microprocessor 64 is coupled to a control circuit 80 which comprises a printed circuit board, a speedometer 72 and tachometer 74. Alternatively, control circuit 80 can comprise one or more analog and/or digital electrical or electronic components, and may include a microprocessor, control circuit, application-specific integrated circuit (ASIC), programmable logic, and/or other circuit elements. In this exemplary embodiment, control circuit 80 is configured to receive data via one or more electrical wires or buses from a plurality of automobile systems within the automobile. For example, control circuit 80 can be configured to receive fuel data from a fuel level sensor and engine oil temperature data from an engine oil temperature sensor on an automobile.

In another exemplary embodiment, light sources are illuminated so that consecutive illumination of light sources gives the appearance of a waving array of lights. Instrument cluster 10 comprises a light channel and a plurality of light sources coupled to the light channel. A control circuit is configured to selectively illuminate the plurality of light sources in sequence based on the location of the light sources in the instrument cluster 10, e.g., from left to right, top to bottom, vice-versa, diagonally, or in repeated waving patterns. The control circuit is configured to sequentially illuminate the plurality of light sources upon receipt of the signal. Such an arrangement may be ideal for vehicle start up, such as in an animation sequence described in co-pending U.S. application Ser. No. 11/195,112, filed Aug. 2, 2005, entitled "Instrument Cluster Animation Bypass System, Method and Computer Code Product," which is hereby incorporated by reference in its entirety.

Figure 5A:
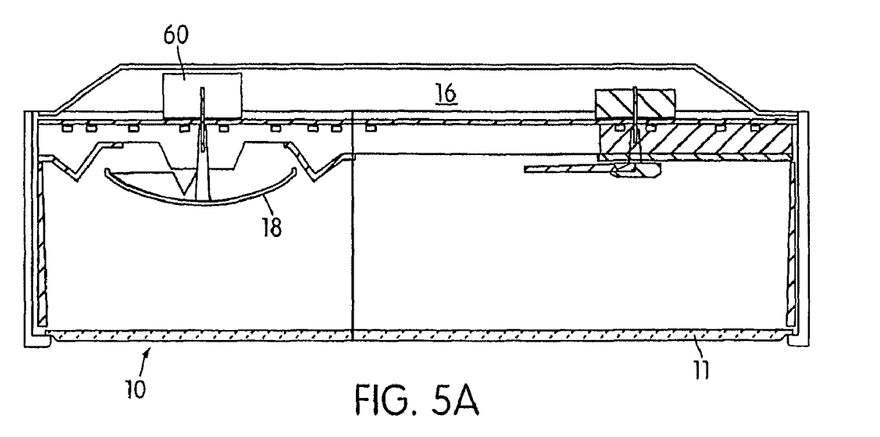
FIG. 5 is a schematic a top cross-sectional view of an instrument cluster, according to an exemplary embodiment.
Figure 5B:
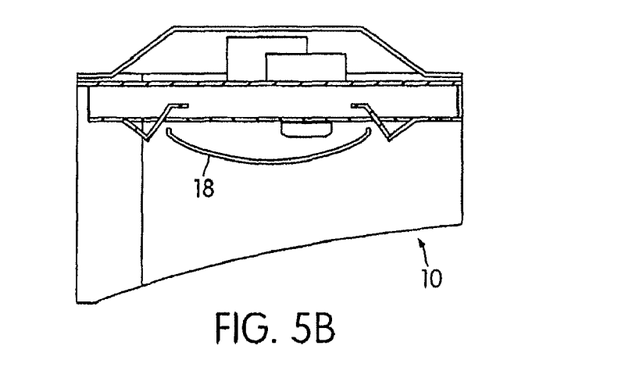

In another exemplary embodiment, a display 90a-j, as shown in FIGS. 5 and 8 is provided within instrument cluster 10. Display 90 is configured to illustrate a number of preset messages or "tell tails". Such preset messages can be event triggered to display the information that is likely to be of most relevance to the vehicle operator. For example, display may be arranged to display "Fuel Tank Low" or an image of an empty fuel tank or an animated picture of a car stranded on the side of a road as a result of running out of fuel. Personal reminders may also be preset into display 90. For example, "Have a nice day", "Buckle Your Safety Belt", or "Pick up Joey from soccer practice at 4:00 pm". Such messages can be displayed during start up, shut down, upon reaching a certain vehicle speed, or in response to the values of other vehicle data and/or user settings. In the illustrated exemplary embodiment, information displayed on appliqué (e.g., 18 or 20) corresponds to information shown on display 90. For example, if user is traveling over the legal speed limit a message such as "Slow Down" may appear on display while value indicia is moved toward (e.g., the 80 MPH indicia on appliqué 20) in instrument cluster 10. In the exemplary embodiment control circuit 64 is coupled to light source (e.g., 50 or 52) and display 90. The control circuit is configured to receive a plurality of signals (or vehicle data). Signal 70 corresponds to at least one indicia in the plurality of indicia of an appliqué. Upon receiving a signal in the plurality of signals, control circuit 64 is configured to illustrate the corresponding message in the plurality of messages and activate the corresponding indicia in the plurality of indicia.

Figure 6:
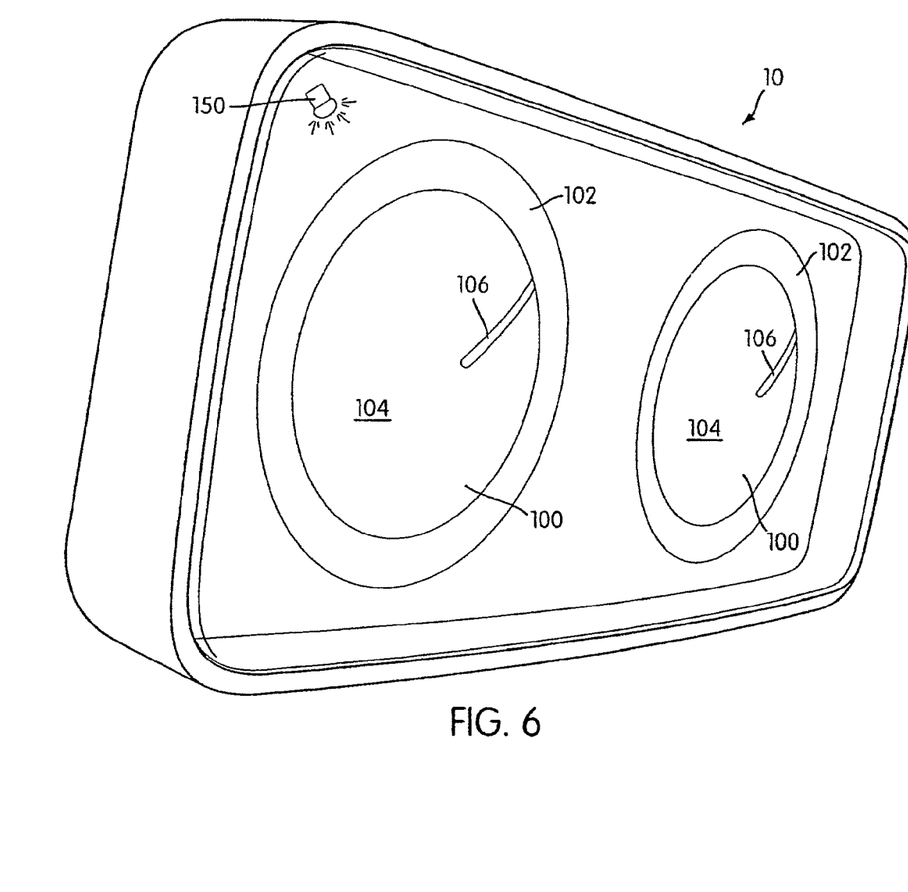
FIG. 6 is a schematic of an instrument cluster, according to another exemplary embodiment.
Figure 7:
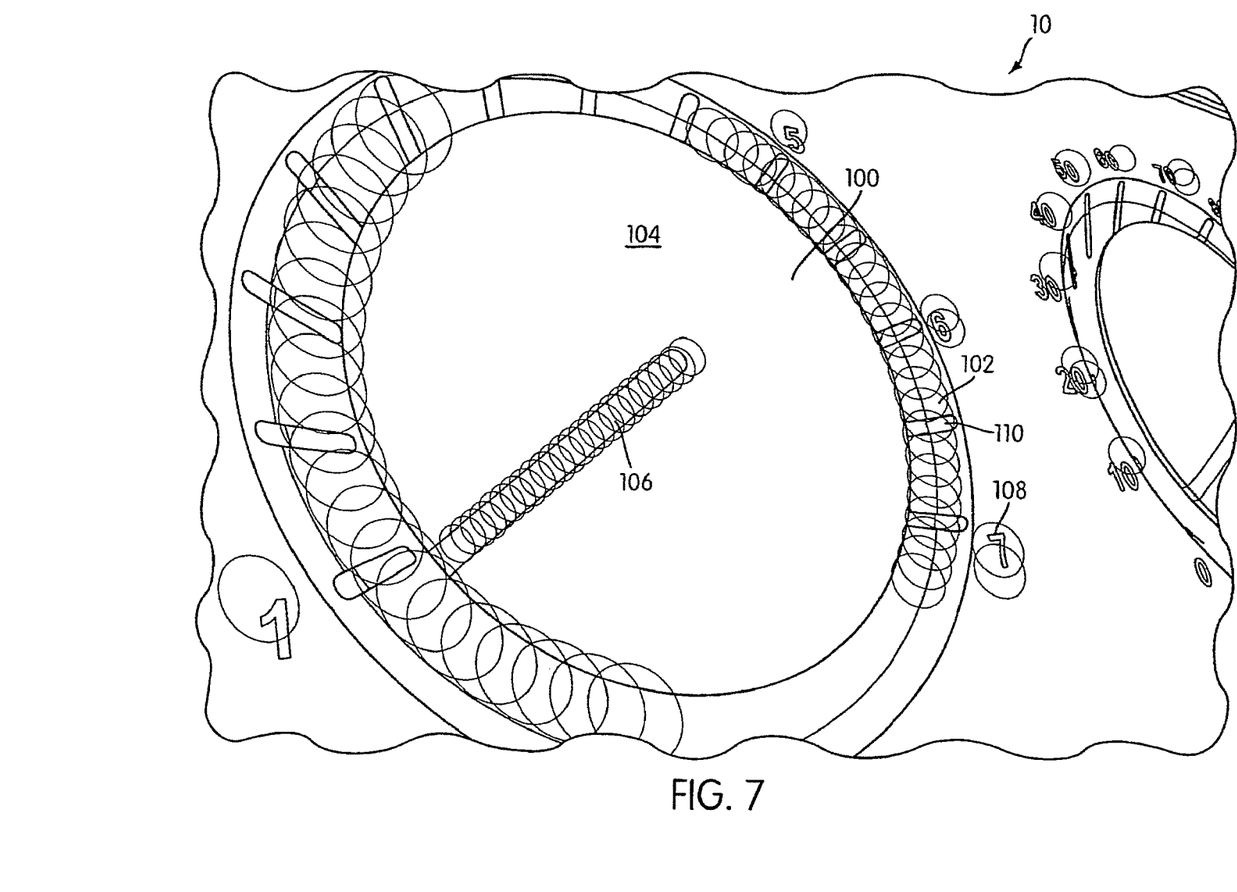
FIG. 7 is a schematic of an instrument cluster, according to yet another exemplary embodiment.
Figure 8A:
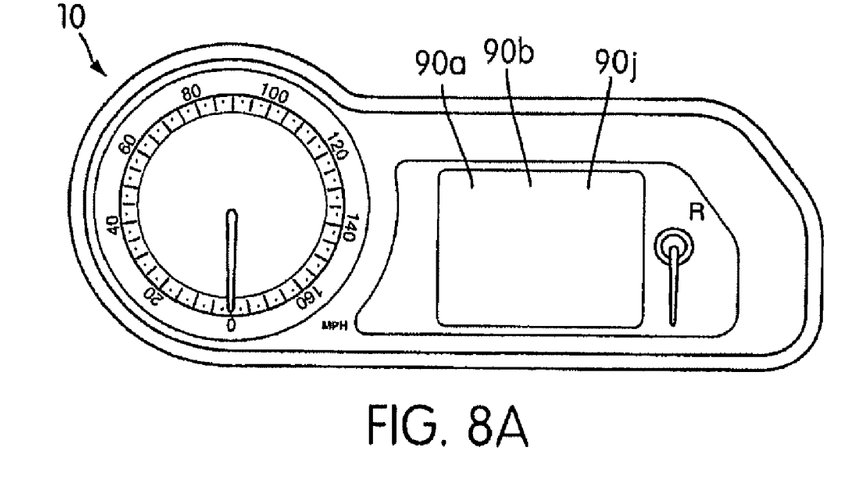
FIG. 8 is a schematic of plurality of instrument clusters, according to yet another exemplary embodiment.
Figure 8B:
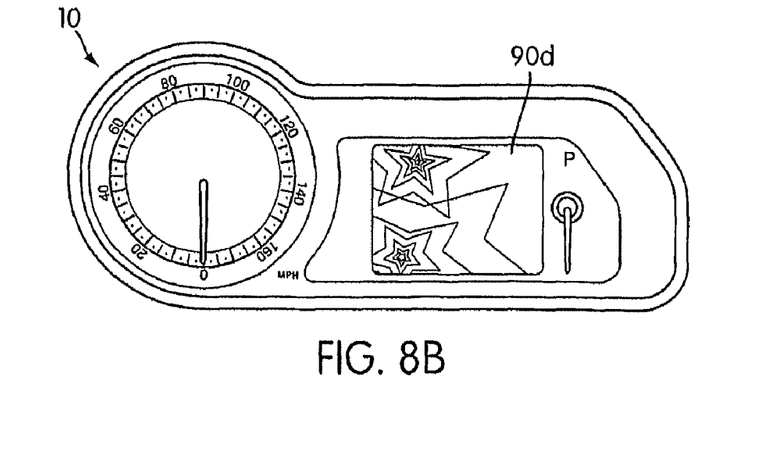
Figure 8C:
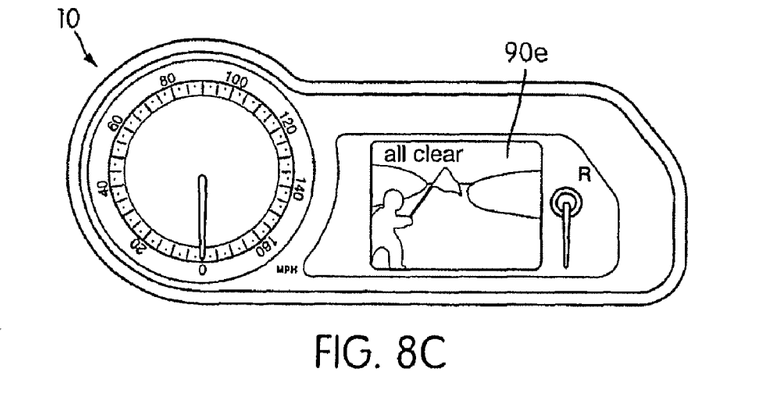
Figure 8D:
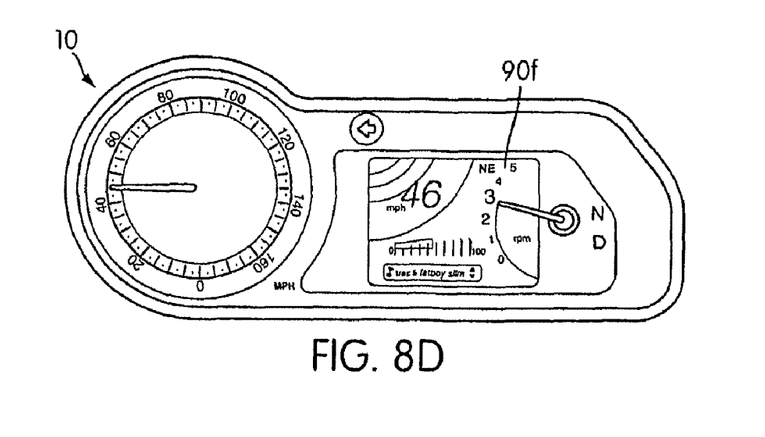
Figure 8E:
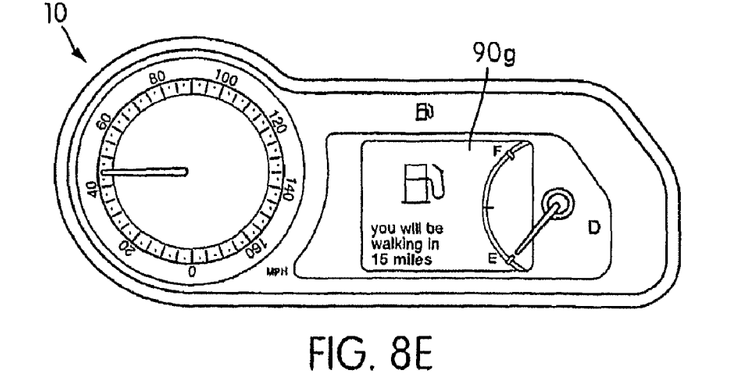
Figure 8F:
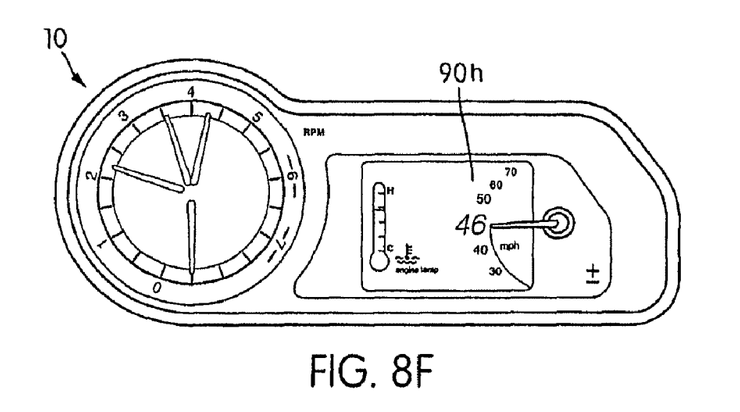
Figure 8G:
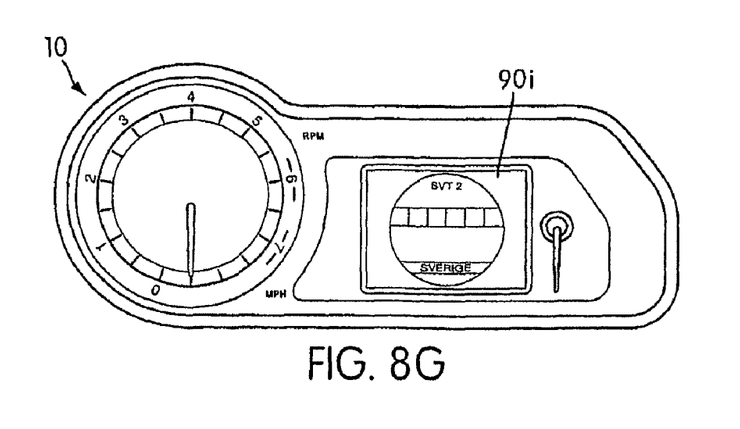

In yet another exemplary embodiment, as illustrated in FIGS. 5-7 board 100 (or appliqué) includes a scale portion 102 (having indicia 108). Scale portion 102 has hash marks 110 or a scale. A hub 104 defines a non-protruding value indicia 106 which is flush to hub 104 and is configured to rotate with respect to scale portion 102. Hub 104 can be of various shapes. As hub 106 rotates, value indicia 106 rotates; both are driven by a stepper motor (e.g., 62) controlled by control circuit 64. In the illustrated exemplary embodiment, hub 104 comprises an appliqué 100 defining value indicia 106 by way of a transparent portion of hub 104 in board 100. Hub 104 is coupled to instrument cluster 10 in front of board 100 with respect to the vehicle interior of the passenger vehicle. In one exemplary embodiment, hub 104 and scale portion 102 are selectively illuminable by light source 150 controlled by control circuit 80. When hub 104 and scale portion 102 are not illuminated hub 104 and scale portion 102 are substantially opaque so as to appear invisible to a vehicle user (e.g., instrument cluster 10 would have what is commonly referred to as a "dead front" appearance). In other exemplary embodiments, hub 104 may comprises materials other than appliqués and value indicia 106 which can by printed onto the hub or may comprise a light pipe or guide or other material which can be lighted by a light source to provide the appearance of a value indicia to the user. Stepper motor 62 is governed by a control circuit 80 which is also configured to receive an input signal instructing light source (e.g., 50 or 52) to illuminate hub 104 and scale portion 102. Hub 104 and scale portion 102 also have an active and inactive state in which hub and scale portion are selectively visible by the vehicle operator. In active state hub 104 and scale portion 102 are illuminated by a light source.

While the exemplary embodiments illustrated in the Figures and described above are presently preferred, it should be understood that these embodiments are offered by way of example only. Accordingly, the present invention is not limited to a particular embodiment but extends to various modifications that nevertheless fall within the scope of the appended claims.

What is claimed is:

1. An instrument cluster for use in a passenger vehicle, the instrument cluster, comprising:
   first appliqué, wherein the first appliqué includes a plurality of first indicia corresponding to first vehicle data;
   a second appliqué overlapping the first appliqué, wherein the second appliqué includes a plurality of second indicia corresponding to second vehicle data;
   a first light source configured to selectively illuminate the plurality of first indicia;
   a second light source, configured to selectively illuminate the plurality of second indicia;
   a third indicia configured to indicate a value of the first and second vehicle data using the plurality of first and second indicia, respectively; and
   a control circuit operatively connected to the third indicia such that the control circuit is configured to cause (i) the third indicia to indicate the value of the first vehicle data using the plurality of first indicia when the first light source illuminates the plurality of first indicia and (ii) the third indicia to indicate the value of the second vehicle data using the plurality of second indicia when the second light source illuminates the plurality of second indicia.

2. The instrument cluster for use in a passenger vehicle as claimed in claim 1, further comprising:
   a reconfigurable display configured to illustrate a plurality of messages, wherein the first and second appliqués are positioned such that each of the plurality of messages are displayed within a same location;
   wherein each message in the plurality of messages corresponds to at least one indicia in the plurality of first indicia and the plurality of second indicia,
   wherein the control circuit is coupled to the first and second light sources and reconfigurable display;
   wherein the control circuit is configured to receive a plurality of signals indicating which of the plurality of first indicia and the plurality of second indicia is to be illuminated;
   wherein upon receiving a signal in the plurality of signals the control circuit is configured to control the first and second light sources to illuminate the corresponding one of the plurality of first indicia and the plurality of second indicia.

3. The instrument cluster for use in a passenger vehicle as claimed in claim 1, wherein the second light source is on a vehicle interior side of the second appliqué.

4. The instrument cluster for use in a passenger vehicle as claimed in claim 1, wherein the third indicia extends from the first and second appliqué and is configured to move with respect to one of (i) the plurality of first and second indicia and (ii) the first and second appliqué.

5. The instrument cluster for use in a passenger vehicle as claimed in claim 1, wherein the third indicia includes a plurality of third indicia and wherein the first and second light sources are configured to illuminate any one of the plurality of third indicia.

* * * * *